UNITED STATES PATENT OFFICE.

WILLIAM G. FUERTH, OF NEWARK, NEW JERSEY, ASSIGNOR TO THE REDDING INK AND DUPLICATOR COMPANY, OF NEW JERSEY.

INK.

SPECIFICATION forming part of Letters Patent No. 437,588, dated September 30, 1890.

Application filed June 5, 1890. Serial No. 354,395. (No specimens.)

*To all whom it may concern:*

Be it known that I, WILLIAM G. FUERTH, a citizen of the United States, residing at Newark, in the county of Essex and State of New Jersey, have invented certain new and useful Improvements in Inks, of which the following is a full and clear description.

I first form a composition consisting of petroleum—which has been volatilized until a residuum of its wax has been procured, in consistency similar to the product known as "vaseline"—with equal parts of some fatty substances—such as refined linseed-oil in its oxidized state—which I form or compound from the following: By superheating forty gallons of refined quality of linseed-oil with an equal quantity, by weight, of the following articles: dried and crystallized sulphate of zinc, litharge, red lead, and binoxide of manganese, of each seven (7) pounds, all aqueous and fatty substances being removed from the oil by this process, an equal mixture of these ingredients blended in a vat can be ground with all mineral or vegetable colors or pigments. To form my improved ink this mixture is to be ground or dissolved with the pigments in proportion to the strength of color desired or the nature or class of pigment used, forming a solid jelly or concentrated ink. My ink thus formed is to a remarkable degree non-evaporating, and will not clog or harden on ordinary roller-composition or any non-fibrous material. Friction, by means of propelling the roller over same, will at all times, without the admixture of other ingredients, reduce same to the desired consistency, which is not, so far as I am aware, possible with any other known make of ink for use in connection with stencil, ribbon, pads, or similar reproducing processes or appliances by impressment or otherwise, with or without the roller process.

I form a reduced or jelly compound by adding to my mixture, as compounded above, of the balsam of fir one per cent., pure linseed-oil ten (10) per cent., and benzine, to be added in respective order as soon as the one previously added has been heated to 210° Fahrenheit and has become fully assimilated. The benzine is to be added only after the compound has been cooled. When so reduced and prepared, they form my concentrated or compressed printing-ink, which will require no admixture of other ingredients to reduce same to the desired consistency for stencil or general printing purposes. It will not cake or harden on ordinary roller compositions; it will not precipitate; it will not spread or flow when printed, and cannot leak or spill from the packages, and will not be affected by hot or cold temperatures, and will work equally well in all climates, whether dry or humid, and also will not tack or tear the stencil, as it is practically non-adhesive.

Having thus described my invention, what I claim as new, and desire to secure by Letters Patent, is—

1. A stiff, concentrated, or condensed ink consisting of vaseline combined with a fatty substance and coloring-matter, substantially as herein described.

2. A stiff, concentrated, or condensed ink composed, essentially, of vaseline, linseed-oil, and coloring-matter, forming a jelly-like compound, which is rendered limpid by friction without the admixture of fluid matter, substantially as herein described.

WILLIAM G. FUERTH.

Witnesses:
W. H. PATTERSON,
CHAPMAN FOWLER.